US007473304B2

(12) United States Patent
Besi

(10) Patent No.: US 7,473,304 B2
(45) Date of Patent: Jan. 6, 2009

(54) AIR FILTRATION DEVICE FOR CLOSED ENVIRONMENTS

(76) Inventor: Mario Besi, Piazza Zavattari, 3, 20149 Milano (IT)

( * ) Notice: Subject to any disclaimer, the term of this patent is extended or adjusted under 35 U.S.C. 154(b) by 39 days.

(21) Appl. No.: 11/806,291

(22) Filed: May 31, 2007

(65) Prior Publication Data

US 2007/0283810 A1 Dec. 13, 2007

(30) Foreign Application Priority Data

Jun. 9, 2006 (EP) ................................. 06425389

(51) Int. Cl.
*B03C 3/016* (2006.01)

(52) U.S. Cl. ....................... 96/16; 96/64; 96/73; 96/87; 96/88; 96/224; 422/121; 422/186.3

(58) Field of Classification Search ..................... 96/16, 96/60, 62, 64, 73, 74, 83, 84, 86–88, 224; 422/24, 121, 186.04, 186.3
See application file for complete search history.

(56) References Cited

U.S. PATENT DOCUMENTS 3,403,252 A * 9/1968 Nagy ......................... 361/231
4,102,654 A * 7/1978 Pellin ............................ 96/16
4,203,948 A * 5/1980 Brundbjerg ................. 422/121
5,112,370 A * 5/1992 Gazzano ..................... 422/121
5,492,557 A * 2/1996 Vanella .......................... 96/16
5,993,738 A * 11/1999 Goswani ...................... 422/22
6,149,717 A * 11/2000 Satyapal et al. ................ 96/16
6,235,090 B1 * 5/2001 Bernstein et al. ............... 96/57
6,471,754 B2 * 10/2002 Ammouri ...................... 96/58
6,623,544 B1 * 9/2003 Kaura ............................. 95/3
7,077,890 B2 * 7/2006 Botvinnik ...................... 96/69
2006/0005708 A1 * 1/2006 Yuen ............................. 96/16

FOREIGN PATENT DOCUMENTS

DE 3628612 A1 * 3/1988 .................... 96/16
EP 0 644 379 A1 3/1995

* cited by examiner

*Primary Examiner*—Richard L Chiesa
(74) *Attorney, Agent, or Firm*—Modiano & Associati; Albert Josif; Daniel J. O'Byrne

(57) ABSTRACT

An air filtration device for suppressing biological pollutants for closed environments, including at least one enclosure with at least one air inlet, at which at least one perforated conducting grille is located, that has a present negative electrical potential adapted to emit electrons when air flows, so as to give negative electric charge to particles to which microorganisms adhere, at least one air passage duct being formed between at least one plate having predefined positive potential for collecting negatively charged particles to which microorganisms adhere, at least one deflector plate having a negative potential adapted to divert the particles to which microorganisms adhere, an electrical field being generated between the collector plate and the deflector plate, facing each other, the field to divert and precipitate the particles to which the microorganism adhere onto the collector plate, and an inactivator for inactivation of the microorganisms provided and at least one filtered air outlet.

7 Claims, 1 Drawing Sheet

AIR FILTRATION DEVICE FOR CLOSED ENVIRONMENTS

The present invention relates to an air filtration device for suppressing biological pollutants for closed environments; such biological pollutants can be viruses, bacteria, spores, molds, fungi, and the like.

BACKGROUND OF THE INVENTION

It is known that protecting the health of people who work in closed environments, for example at home, in offices, hospitals, vehicles and aircraft of various kinds and other environments, is a considerably important requirement. These filtration devices must be fitted at the air outlets in ventilation and climate control systems and devices and the like for closed environments (civil environments, hospital environments and the like) and of means of transport (aircraft, trains, ships, military vehicles, even in spacecraft, and others), yet they are scarcely used and are not usually installed except in particular environments, such as for example a hospital environment, to suppress particles and in particular the microorganisms contained in the air, in order to preserve the health of people.

These microorganisms, i.e., biological pollutants such as viruses, bacteria, spores, molds, fungi and the like, are in fact, from a sanitary standpoint, the greatest danger for the health of people, since they can cause diseases and infections, in particular affecting the respiratory system.

Known types of filtration devices generally comprise partitions made of fabric, which are adapted to retain the particles and microorganisms that are present in the air that is made to pass through said partitions.

However, these devices have several drawbacks, since for example the filtration partitions must be cleaned or replaced rather frequently, and therefore they require frequent maintenance, which can be performed by specialized operators, with consequent high costs. Further, these partitions constrict the passage of the air and often, when the device is started, previously collected material may be introduced accidentally into the environment to be controlled, with consequent risks for the health of the people that are present. Moreover, some devices which comprise germicidal means based on UV rays with high emission power can generate gases that are noxious for the health of people, such as ozone, and are also ineffective against particular microorganisms which require, for their inactivation, long periods of exposure to UV rays.

EP-A1-0 644 379 discloses an air de-pollution device comprising a container having at opposite ends an intake grille and an emission grille. Closed inside the container are: filters arranged at the intake grille; a collection device arranged downstream of the filters; and suction means for creating a stream of air through the filters and the collection device, from the intake grille to the emission grille. The collection device comprises, in succession of the air stream flow: an electrification grid supplied with high negative polarity voltage for electrifying particles of the air stream passing therethrough; a pair of opposed plates, a first one of which is a negatively charged deflector plate and the second one of which is a positively charged collector plate; and a germicidal UV-ray neon lamp arranged for emitting light into the passage defined between the pair of opposed plates. The electrification grid electrifies (negatively charges) small particles in the air stream that are then repelled by the deflector plate toward the collector plate upon which they are collected and illuminated by the germicidal UV-ray lamp which thus kills the micro-organisms present in the particulate.

SUMMARY OF THE INVENTION

The aim of the present invention is to solve the drawbacks described above, by providing an air filtration device for closed environments that allows total suppression and assured inactivation of microorganisms, i.e., allows total air filtration, preserving the health of the people who work in closed environments.

Within this aim, an object of the present invention is to provide a device that requires much less frequent maintenance than known devices and whose maintenance is simple and quick, so that it can be performed even by unspecialized personnel, with gains also in economic terms.

Another object of the present invention is to provide a device which, by means of its particular constructive characteristics, is capable of giving the greatest assurances of reliability and safety in use.

Another object of the present invention is to provide a device that is simple, relatively easy to provide in practice, safe in use and effective in operation, and which may also be competitive from an economic standpoint.

This aim and these and other objects, which will become better apparent hereinafter, are achieved by an air filtration device for suppressing biological pollutants for closed environments, of the type that can be associated with the air outlets in ventilation, climate control and similar devices and systems, characterized in that it comprises at least one box-like enclosure provided with at least one inlet for the air to be filtered, at which at least one perforated conducting grille is located, said grille having a preset negative electrical potential and being adapted to emit electrons when air flows, so as to give a negative electric charge to the particles to which the microorganisms present in said air adhere, said device forming internally at least one air passage duct, which is formed between at least one plate for collecting the negatively charged particles to which the microorganisms adhere, said collector plate having a predefined positive potential, and at least one deflector plate, which has a negative potential and is adapted to divert the particles to which the microorganisms adhere, an electrical field being generated between said collector plate and said deflector plate, which face each other, said field being adapted to divert and precipitate the particles to which the microorganisms adhere onto said collector plate, means for inactivation of the microorganisms being provided, at least one outlet for the filtered air being also provided.

In accordance with the invention, there is provided an air filtration device as defined in the appended claims.

BRIEF DESCRIPTION OF THE DRAWINGS

Further characteristics and advantages of the invention will become better apparent from the following detailed description of a preferred but not exclusive embodiment of an air filtration device for closed environments according to the invention, illustrated by way of non-limiting example in the accompanying drawings, wherein.

DESCRIPTION OF THE PREFERRED EMBODIMENTS

Figure 1:
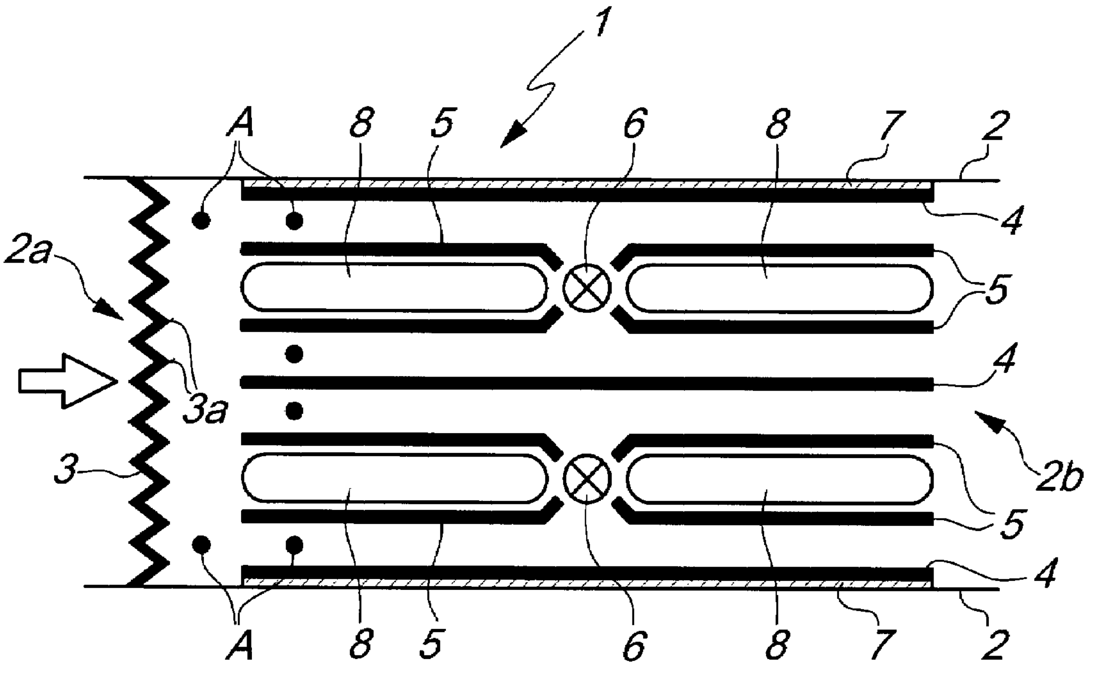
FIG. 1 is a schematic sectional side view of a filtration device according to the invention.

With reference to the figures, the reference numeral 1 generally designates an air filtration device for the suppression of biological pollutants for closed environments according to the invention; said biological pollutants can be viruses, bacteria, spores, molds, fungi, and the like.

The device 1 is of the type that can be associated with the air outlets in ventilation and climate control and similar systems and devices, and comprises a box-like enclosure 2, provided with at least one inlet 2*a* for the air to be filtered, at which at least one perforated conducting grille 3 for the passage of the incoming air is located. The grille 3 has a preset negative electrical potential and is adapted to emit electrons E when air flows, so as to give a negative electric charge to the particles to which the microorganisms present in the air adhere. The device 1 forms internally at least one air passage duct, which is formed between at least one collector plate 4 for the negatively charged particles to which the microorganisms A adhere, the plate 4 having a predefined positive potential, and at least one deflector plate 5, which has a predefined negative potential and is adapted to divert the particles to which the microorganisms A adhere: an electrical field is generated between the collector plate 4 and the deflector plate 5, which face each other, said field being adapted to divert and precipitate the particles to which the microorganisms A adhere onto the collector plate 4. Advantageously, there are means 6 for inactivating the microorganisms, and there is also at least one outlet 2*b* for the filtered air.

Positively, the grille 3, kept at a negative electrical potential with respect to the ground, comprises a distribution of pointed protrusions 3*a* for scattering the electrons E when air passes through the grille 3, which allow the cohesion of the microorganisms to the negatively charged particles.

In greater detail, the device 1 comprises a distribution of collector plates 4 and of deflector plates 5, which face each other and are mutually parallel, in order to deflect and precipitate the particles, to which the microorganisms A adhere, onto the collector plates 4. In the embodiment shown in the figures, the device 1 comprises three collector plates 4 and eight deflector plates 5: two collector plates 4 are located respectively in an upper region and in a lower region inside the box-like enclosure 2, and each of said plates faces two respective deflector plates 5 arranged in succession, while the third collector plate 4 is arranged along the centerline within the box-like body 2, and each one of its sides faces two deflector plates 5 arranged in succession; the deflector plates 5 are arranged in pairs located side by side in succession, two by two, between the collector plates 4.

Conveniently, an insulating layer 7 is interposed between the enclosure 2 and the collector plates 4 arranged in an upper region and in a lower region inside it.

In greater detail, the device 1 comprises elements 8 for supporting and shaping the deflector plates 5, which are associated with the box-like enclosure 2; two mutually opposite deflector plates 5 are associated with each supporting and shaping element 8.

The inactivation means 6 comprise at least one UV-ray germicidal lamp, and preferably two germicidal lamps 6 accommodated within the box-like enclosure 2, which irradiate continuously the collector plates 4 so as to inactivate the microorganisms that have precipitated thereon and thus prevent their proliferation.

In particular, the lamps 6 are of the low emission power type, so as to avoid the formation of noxious gases, such as ozone, which is notoriously harmful for the health of people.

The device 1 can comprise in output an ionizer (not shown in the figures), which is adapted to rebalance the negative electrical charges, returning them to optimum values, so as to ensure air quality in closed environments.

Figure 2:
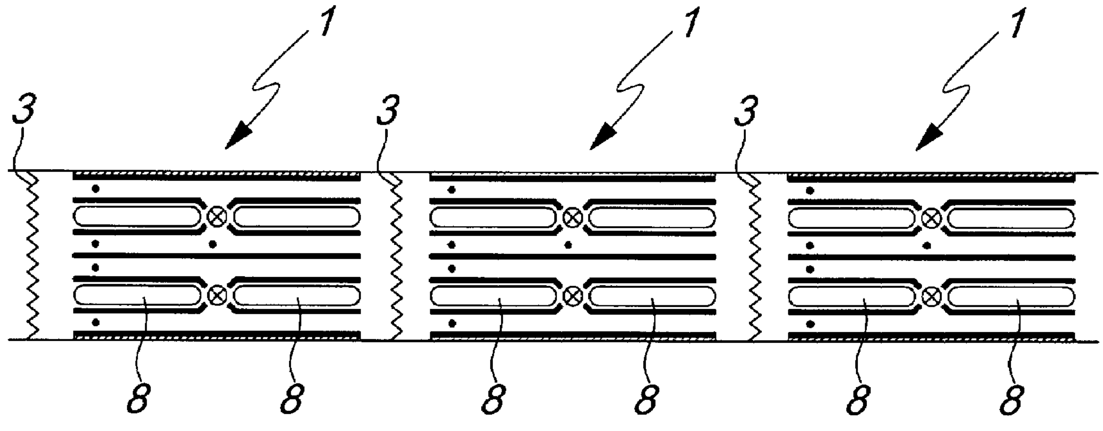
FIG. 2 is a schematic side view of three devices connected in succession, according to the invention.

The device 1 can be associated in succession with at least one other device 1, and it is possible for example to arrange in series three filtration devices 1, as shown in FIG. 2, with each outlet 2*b* of the devices 1 arranged upstream connected to the respective inlet 2*a* of the device 1 arranged directly downstream.

In practical operation, the device 1 can be installed at the air outlets in ventilation, climate control and similar systems and devices; the air that enters the device 1 passes through the perforated grille 3, which is kept at a negative potential with respect to the ground, and thanks to the pointed protrusions 3*a* with which it is provided scatters electrons, allowing to transfer a negative electrical charge to the particles on which the microorganisms are deposited.

When air passes between the deflector plates 5 and the collector plates 4, which face each other and are mutually parallel, the particles, with the microorganisms A adhering thereto, are repelled by the former (which are kept at a negative potential) and collect on the latter (at a positive potential), onto which they are conveyed by the electrical field generated between the plates 4, 5.

The germicidal UV-ray lamps 6 with low emission power, by irradiating the collector plates 4 continuously, inactivate and kill the microorganisms, so that they cannot proliferate. In this manner, total air filtration is achieved, suppressing all the microorganisms that are present therein. The air, at the outlet 2*b*, can be made to pass through the ionizer (if provided), which allows optimum rebalancing of the electrical charges in the filtered air to be introduced in the environments.

The power supply of the device 1 is of the traditional type, and is for example connected to the electrical system by way of known means. Positively, the device 1 can be installed at the air outlets in ventilation, climate control and similar devices and systems, of any environment (civil, hospital and the like) and of any vehicle (aircraft, trains, ships, military vehicles, even in spacecraft, and others) in order to protect the health of people. For example, in the medical and hospital field, the device 1 can also be used to isolate individual beds in case of epidemics.

As mentioned, it is possible to arrange in succession a plurality of devices 1 in order to achieve 100% suppression (absolute filtration) of the microorganisms that are present in the air in the case of ventilation, climate control and similar systems of considerable size with a high air flow rate.

Advantageously, the device 1 as conceived does not offer appreciable resistance to the flow of air, and when it is started it does not release any material into the environment, since the particles with the microorganisms A are retained on the collector plates 4; effectively, the maintenance of the device 1 can be performed at very long time intervals and is simple and quick (cleaning of the collector plates 4 is extremely facilitated, and so is the replacement of the device), accordingly not requiring the intervention of specialized operators, with a considerable financial saving. Positively, even in the absence of maintenance there is in any case no danger for people.

In practice it has been found that the device according to the invention fully achieves the intended aim and objects, since the air filtration device 1 for closed environments allows advantageously total suppression and assured inactivation of microorganisms, i.e., of biological pollutants such as viruses, bacteria, spores, molds, fungi and the like, contained in the air, preserving the health of people in closed environments; positively, the germicidal lamps 6 with low emission power further avoid the production of harmful gases, such as ozone, and the continuous irradiation of the microorganisms, blocked on the collector plates, allows inactivation of even the most resistant strains.

The invention thus conceived is susceptible of numerous modifications and variations, all of which are within the scope of the appended claims; for example, in another embodiment, the box-like enclosure 2 of the device 1 can comprise internally a plurality of grilles 3 arranged in succession, between each pair of which at least one collector plate 4 and at least one deflector plate 5 are arranged so as to be mutually parallel and face each other, and between which at least one germicidal lamp 6 for irradiating the collector plate 4 is arranged.

All the details may further be replaced with other technically equivalent ones.

In the embodiments shown, individual characteristics, given in relation to specific examples, may actually be interchanged with other different characteristics that exist in other embodiments.

Moreover, it is noted that anything found to be already known during the patenting process is understood not to be claimed and to be the subject of a disclaimer.

In practice, the materials used, as well as the shapes and the dimensions, may be any according to requirements and to the state of the art without thereby abandoning the scope of the protection of the appended claims.

The disclosures in European Patent Application No. 06425389.1 from which this application claims priority are incorporated herein by reference.

What is claimed is:

1. An air filtration device for suppressing biological pollutants for closed environments, that is suitable to be associated with air outlets in ventilation, climate control and air purification devices and systems, comprising: at least one box-shaped enclosure provided with at least one inlet for air to be filtered; at least one perforated conducting grille located at said at least one inlet, said grille having a preset negative electrical potential and being adapted to emit electrons when air flows, so as to give a negative electric charge to any particles to which microorganisms present in the air adhere; at least one air passage duct formed internally to the filtration device, between at least one collector plate for collecting the negatively charged particles to which microorganisms adhere, said collector plate having a predefined positive potential; at least one deflector plate, which has a negative potential and is adapted to divert the particles to which microorganisms adhere, whereby an electrical field is generated between said collector plate and said deflector plate, which face each other, said field being adapted to divert and precipitate the particles to which microorganisms adhere onto said collector plate; inactivation means for inactivation of microorganisms that is provided and at least one air outlet of the filtration device for exit of filtered air, said grille comprising a distribution of pointed protrusions for scattering the emitted electrons when air passes through said grille; and wherein three said collector plates and eight said deflector plates are provided, two of said collector plates being located respectively in an upper region and in a lower region inside said box-shaped enclosure, each said collector plate facing two respective said deflector plates arranged in succession, with a third said collector plate being arranged substantially at a centerline within said box-shaped enclosure, each side of said third collector plate facing two said deflector plates arranged in succession, said deflector plates being arranged in pairs which are arranged side by side in succession, two by two, between said collector plates, and wherein said inactivation means comprises two germicidal lamps, each one of which is arranged between a pair of said two respective deflector plates arranged in succession.

2. The device of claim 1, comprising at least one insulating layer, which is interposed between said box-shaped enclosure and said collector plates arranged in an upper region and in a lower region inside said enclosure.

3. The device of claim 1, comprising supporting elements for supporting and shaping said deflector plates, said supporting elements being associated with said box-shaped enclosure.

4. The device of claim 1, wherein said lamps are of the low-power type, suitable to avoid generation of harmful gases.

5. The device of claim 4, comprising an ionizer, which is located substantially at the air outlet from which the air exits from the filtration device, said ionizer being adapted to rebalance negative electrical charges that are present in the air.

6. The device of claim 5, suitable to be associated for operation in succession, with at least one other similar device, an outlet of a said device arranged upstream being connected to an inlet of a said device arranged downstream.

7. The device of claim 4, wherein said box-shaped enclosure comprises a plurality of said grilles arranged in succession, with at least one collector plate and at least one deflector plate being arranged between each pair of said grilles so as to be mutually parallel and face each other, and at least one germicidal lamp for irradiating at least said collector plate being located between each pair of said grilles.

* * * * *